(12) United States Patent
Kim et al.

(10) Patent No.: US 8,616,568 B2
(45) Date of Patent: Dec. 31, 2013

(54) STRUCTURE OF VEHICLE SUBFRAME

(71) Applicant: Hyundai Motor Company, Seoul (KR)

(72) Inventors: Bo-Min Kim, Seoul (KR); Dae-Sik Ko, Hwasung-si (KR); Eui-Keun Jeong, Gunpo-shi (KR)

(73) Assignees: Hyundai Motor Company, Seoul (KR); Hwashin Co. Ltd., Yeongcheon-si (KR)

( * ) Notice: Subject to any disclaimer, the term of this patent is extended or adjusted under 35 U.S.C. 154(b) by 0 days.

(21) Appl. No.: 13/652,737

(22) Filed: Oct. 16, 2012

(65) Prior Publication Data

US 2013/0147145 A1     Jun. 13, 2013

(30) Foreign Application Priority Data

Dec. 9, 2011    (KR) .................. 10-2011-0131637

(51) Int. Cl.
*B60G 7/02*    (2006.01)
*B62D 21/11*   (2006.01)

(52) U.S. Cl.
USPC ...... 280/124.109; 280/124.134; 280/124.135; 280/124.138; 280/124.141; 180/359; 180/360

(58) Field of Classification Search
USPC ............ 280/124.103, 124.109, 124.134, 280/124.135, 124.138, 124.141; 180/210, 180/215, 359, 360
See application file for complete search history.

(56) References Cited

U.S. PATENT DOCUMENTS

| | | | | |
|---|---|---|---|---|
| 5,427,395 | A * | 6/1995 | Urbach | 280/124.134 |
| 6,516,914 | B1 * | 2/2003 | Andersen et al. | 180/360 |
| 6,755,429 | B1 * | 6/2004 | Buchwitz et al. | 280/124.109 |
| 7,377,522 | B2 * | 5/2008 | MacIsaac | 280/5.507 |
| 7,500,687 | B2 * | 3/2009 | Dare-Bryan | 280/124.109 |
| 7,762,368 | B2 * | 7/2010 | Matthies | 180/210 |
| 7,819,411 | B2 * | 10/2010 | Eshelman et al. | 280/124.135 |
| 8,047,557 | B2 * | 11/2011 | Kobayashi et al. | 280/124.135 |
| 2007/0182120 | A1 * | 8/2007 | Tonoli et al. | 280/124.142 |
| 2007/0228683 | A1 * | 10/2007 | Ciasulli | 280/124.1 |
| 2008/0197597 | A1 * | 8/2008 | Moulene et al. | 280/124.103 |
| 2008/0224436 | A1 * | 9/2008 | MacIsaac | 280/124.103 |
| 2011/0215544 | A1 * | 9/2011 | Rhodig | 280/124.103 |

FOREIGN PATENT DOCUMENTS

| | | |
|---|---|---|
| KR | 1998-040143 A | 8/1998 |
| KR | 10-2004-0101795 A | 12/2004 |
| KR | 10-2004-0110801 A | 12/2004 |

* cited by examiner

*Primary Examiner* — Ruth Ilan
*Assistant Examiner* — Darlene P Condra
(74) *Attorney, Agent, or Firm* — Morgan, Lewis & Bockius LLP

(57) ABSTRACT

A structure of a vehicle subframe mounted to a vehicle, in which a wheel hub may be connected to a vehicle body through a lower arm and an upper arm disposed below and above one another, and in which the lower arm may be coupled in a traverse direction of the vehicle may include a plate-shaped body mounted to a lower portion of the vehicle body, and having the lower arm mounted thereon in the traverse direction of the vehicle, and a mounting bracket protruding from the body upwards wherein the upper arm may be pivotally coupled to an upper portion of the mounting bracket.

3 Claims, 6 Drawing Sheets

<NORMAL CONDITIONS>

<IN EVENT OF FRONTAL COLLISION>

STRUCTURE OF VEHICLE SUBFRAME

CROSS-REFERENCE TO RELATED APPLICATIONS

The present application claims priority to Korean Patent Application No. 10-2011-0131637, filed on Dec. 9, 2011, the entire contents of which is incorporated herein for all purposes by this reference.

BACKGROUND OF THE INVENTION

1. Field of the Invention

The present invention relates to the structure of a vehicle subframe, and more particularly, to a vehicle subframe that is integrally provided with a mounting bracket at a top thereof to improve space efficiency so as to allow a double wishbone type suspension to be employed in even compact passenger vehicles.

2. Description of Related Art

As types of independent suspensions, strut type (Macpherson type) and double wishbone type suspensions are widely employed in passenger vehicles.

A strut type suspension has a structure for supporting a vehicle body, in which a strut configured of a shock absorber and a spring is mounted such that the bottom of the strut is mounted on the top of a wheel hub, and a lower arm coupled to a subframe is coupled to the bottom of the wheel hub. While having the advantages of being simple and easy to maintain and repair, and taking up little space on the one hand, the strut type structure is disadvantageous on the other hand by a large amount of frictional force generated by a shock absorber and by providing little lateral support.

A double wishbone type suspension is a structure in which two "V"-shaped (or "Y"-shaped) arms—an upper arm and a lower arm—are mounted on the top and the bottom, respectively, of a wheel hub, and is advantageous in enabling wheel alignment changes or the posture of a vehicle to be relatively freely controlled, and having high rigidity for improved control stability. Specifically, while having the advantages of a relatively greater freedom of design, excellent rigidity, and good vibration insulation, a double wishbone type suspension has the disadvantage of taking up a large amount of space, which limits the use thereof to mostly midsized or larger passenger vehicles.

FIG. 1A illustrates the structure of a double wishbone type suspension in the related art. An upper arm and a lower arm connected to the top and the bottom, respectively, of a wheel hub, have shapes in which ends thereof diverge into two branches to form, as the term "wishbone" suggests, a "V" shape (or a "Y" shape), and the lower arm is mounted from a side direction (a vehicle width direction) of a subframe (mounted at a lower portion of an engine room formed between side members on either side), and the upper arm has a shock absorber to the inside thereof and is mounted to a vehicle body (more specifically, to the upper portion of a side member of the vehicle body disposed to either side of the engine room).

However, an upper arm in a related art double wishbone structure was mounted to a panel portion of a vehicle body so that modularizing the suspension was restrictive and an additional assembly process was required. Further, (in order to prevent excessive changes in camber angle and tread) the length (a) of the upper arm should be provided at a suitable dimension, and in order to secure rigidity at a coupling portion, the upper arm should be mounted to a portion on the vehicle body with high rigidity (for example, on a side member of the vehicle body or nearby), but (because the upper arm tended to be distanced from the side member for the sake of harmonious wheel alignment) the size and the arrangement of the wheel hub is restricted, which leads to the drawback of making it difficult to secure a suitable length for the upper arm.

In addition, when the cross section of a vehicle body side member is enlarged in order to mount the shock absorber or/and enhance the rigidity of the vehicle body, the length of the upper arm can only be further restricted.

As illustrated in FIG. 1B, a structure has been developed in which a shock absorber is disposed lying down along the lengthwise direction of the vehicle body, in order to absorb the magnitude of an impact from a vehicle collision and prevent the front end of the vehicle from diving. In the case of a shock absorber having this arranged structure, the front side of the shock absorber is connected to a bumper mounted on the very front of the vehicle, and the rear side of the shock absorber is mounted in connection through a rocker arm. The rocker arm is in the form of a triangular plate, is mounted on the vehicle body to be capable of pivoting forward and rearward, and has one side thereof connected to the shock absorber and the other side thereof connected to a pushrod connected to the wheel hub.

Accordingly, if the wheel hub is undulated vertically due to impacts from the ground, the pushrod pivots the rocker arm (in the direction indicated by the arrow), and the shock absorber rebounds and bumps along the lengthwise direction of the vehicle body so as to absorb the impact exerted by the pushrod. Further, in the event of a collision to the front of the vehicle, the magnitude of the impact transferred through the bumper is primarily absorbed by the shock absorber, and part of the impact is transferred to the pushrod through the rocker arm and presses on the wheel hub from above so as to raise the front end of the vehicle. This movement of the pushrod counters the tendency of the front end of a vehicle to dive in the event of a vehicle collision and reduces the casualty rate of passengers.

Accordingly, when the above-described impact absorbing structure is applied, the rocker arm and the pushrod should necessarily be provided, leading to further restrictions on the mounting space for the upper arm and the conditions for design requirements.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of a vehicle subframe which is capable of securing a suitable length for an upper arm, enhancing supporting rigidity, and modularizing the suspension.

In an aspect of the present invention, a structure of a vehicle subframe mounted to a vehicle, in which a wheel hub is connected to a vehicle body through a lower arm and an upper arm disposed below and above one another, and in which the lower arm is coupled in a traverse direction of the vehicle, may include a plate-shaped body mounted to a lower portion of the vehicle body, and having the lower arm mounted thereon in the traverse direction of the vehicle, and a mounting bracket protruding from the body upwards wherein the upper arm is pivotally coupled to an upper portion of the mounting bracket.

The mounting bracket may include a bar-shaped base erected upward from a top surface of the plate-shaped body, and a mounting portion formed on a top portion of the base, wherein the upper arm is pivotally connected thereto.

The mounting portion is aligned in a longitudinal direction of the vehicle.

The upper arm is formed with an end portion thereof diverged into two branches to form a "V" shape, wherein the mounting portion may include hinge brackets respectively installed on one side and the other side thereof, and wherein each end of both diverged sides of the upper arm is pivotally coupled to the hinge brackets respectively.

The vehicle body may include a shock absorber disposed along a longitudinal direction of the vehicle, a front end of the shock absorber being connected to a bumper, and a rear end of the shock absorber being coupled to a rocker arm connected to the wheel hub through a pushrod, wherein the mounting portion may include a rocker arm bracket installed between the hinge brackets, the rocker arm bracket being pivotally coupled to the rocker arm, the rocker arm being pivotable in a front to rear direction of the vehicle.

A top surface of the mounting portion is mounted below and directly coupled to a side member of the vehicle body.

The present invention as configured above has the effect of being able to secure a suitable length for an upper arm. Further, with an improved degree of design freedom for the layout, space between components may be more easily secured, and the effect of being able to employ double wishbone suspensions in compact vehicles may be realized.

In addition, while an upper arm was mounted on a vehicle body in a related art double wishbone structure, so that the subframe, shock absorber, and upper arm had to be sequentially mounted on the vehicle body, the subframe of the present invention has the effect in which the upper arm may be pre-mounted on the subframe and then mounted on the vehicle body in order to simplify the assembly process.

Furthermore, because a mounting portion of the present invention is fixed to a side member of the vehicle body, supporting rigidity may be secured even when not only an upper arm, but a rocker arm, are mounted.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
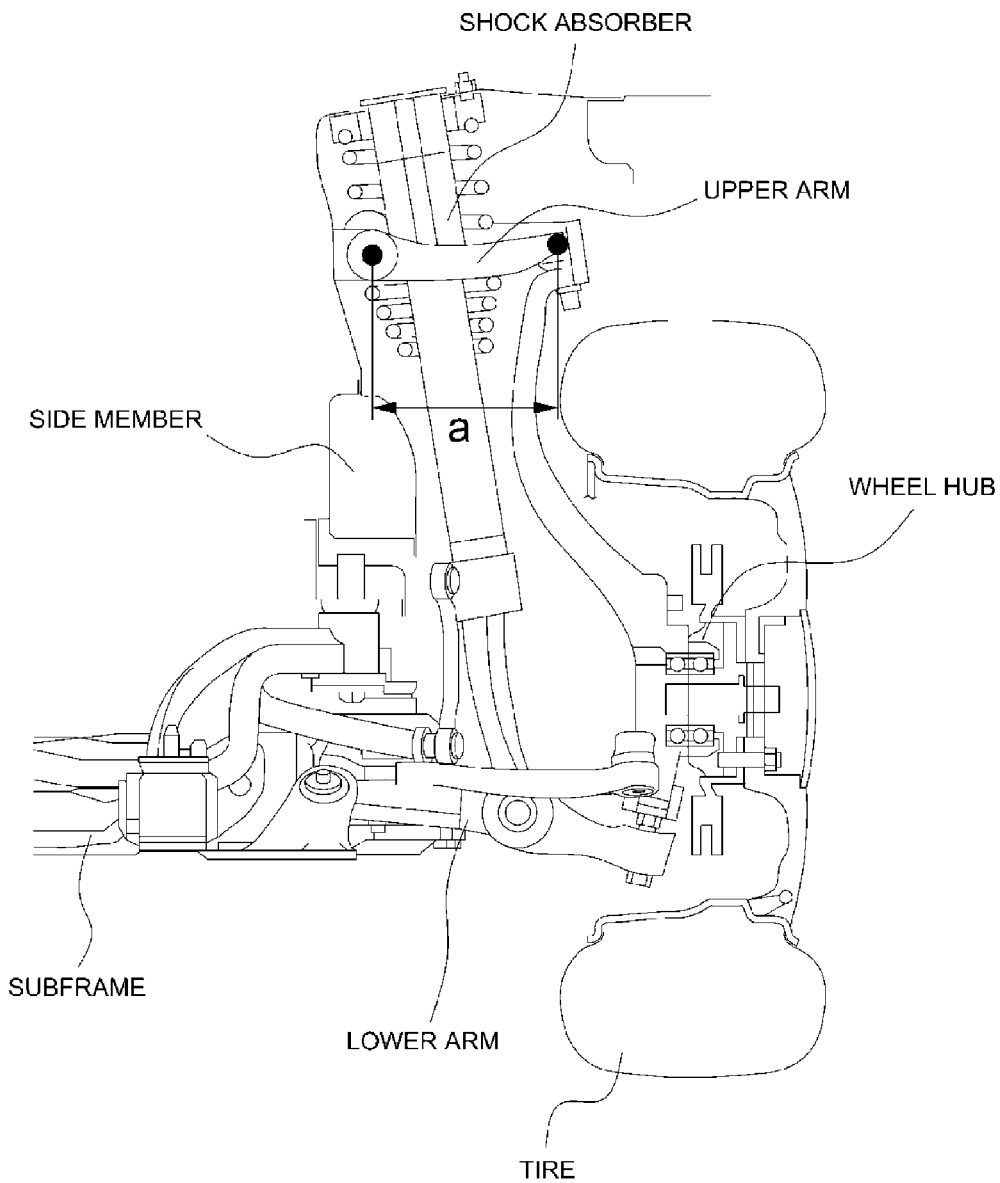
FIG. 1A is a cross-sectional view of the structure of a double wishbone type suspension in the related art.
Figure 1B:
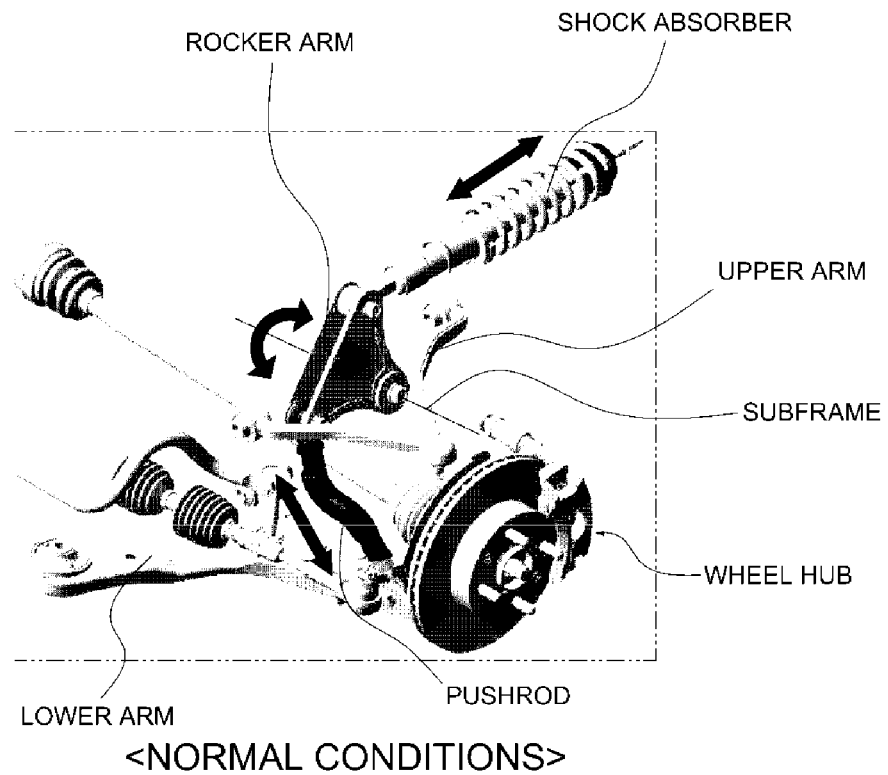
FIG. 1B is a view illustrating a shock absorber disposed in the lengthwise direction of a vehicle body to lessen a magnitude of impact in the event of a frontal collision, and a pushrod and a rocker arm.
Figure 1B:
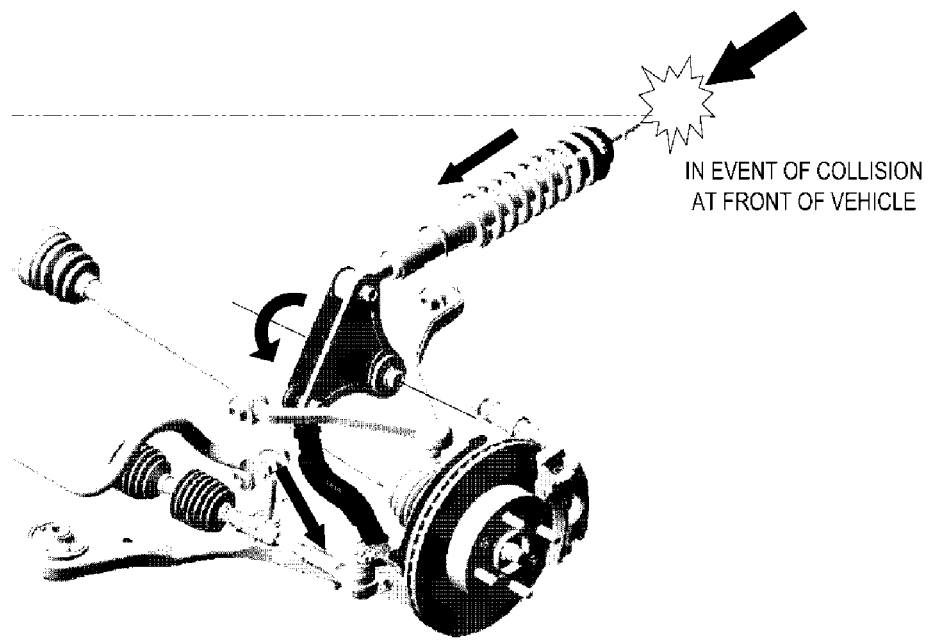

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A subframe 100 according to an exemplary embodiment of the present invention has been developed to be mounted on a vehicle in which a wheel hub 50 on either side is connected to the vehicle body through a lower arm 40 and an upper arm 30 disposed at the top and bottom, and specifically, on a vehicle employing a double wishbone type suspension. Hereinafter, the structure of a vehicle subframe according to exemplary embodiments of the present invention will be described in more detail with reference to the drawings.

Figure 2:
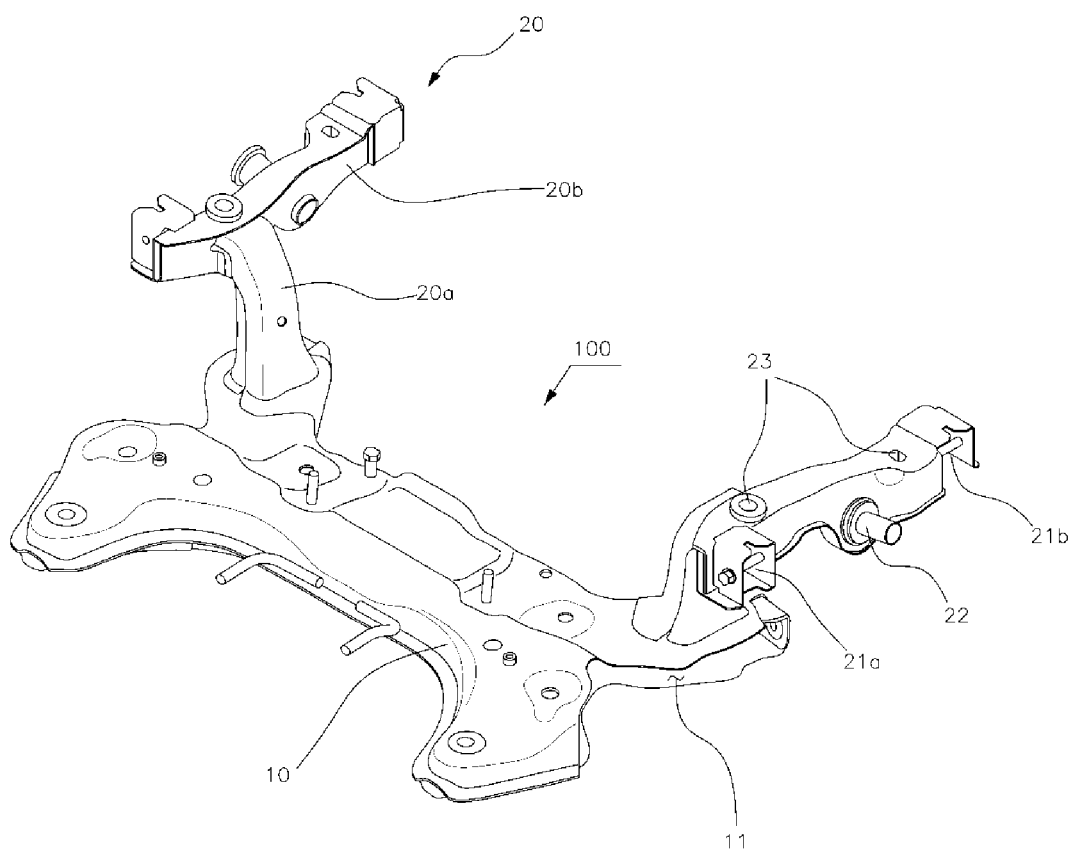
FIG. 2 is a perspective view of a subframe according to an exemplary embodiment of the present invention.

Referring to FIG. 2, the subframe 100 according to an exemplary embodiment of the present invention includes a plate-shaped body 10 in the form of an "I" (or an "H"), and a mounting bracket 20 mounted on either side of the top surface of the body 10.

The body 10 defines an open portion 11 in either side thereof such that the lower arm 40 is inserted and mounted therein, and the mounting bracket 20 has an upper arm 30 mounted thereon.

The mounting bracket 20 includes a bar-shaped base 20a erected vertically from the top of the body 10, and a mounting portion 20b formed on the top of the base 20a and on which the upper arm 30 is connected.

The upper arm 30 of the double wishbone suspension is formed with an end thereof diverged into two branches to form a "V" shape, so that the mounting portion 20b is formed in a bar shape disposed in the lengthwise direction of the vehicle body. Installed respectively on one side and the other side of the mounting portion 20b are hinge brackets 21a and 21b for pivotally coupling both ends of the upper arm 30 thereto.

Another end of the upper arm 30 is pivotally coupled to the wheel hub 50.

A rocker arm bracket 22 may be further installed between the hinge brackets 21a and 21b to correspond to the structure described above in which the rocker arm (reference numeral 60 in FIG. 4) is mounted, so that the rocker arm 60 is rotatably (formed with a rotation shaft) coupled in a front to rear direction.

A bolt hole 23 is perforated in the upper surface of the mounting portion 20b to bolt and couple the mounting portion 20b to the lower surface of the side member of the vehicle body.

Figure 3:
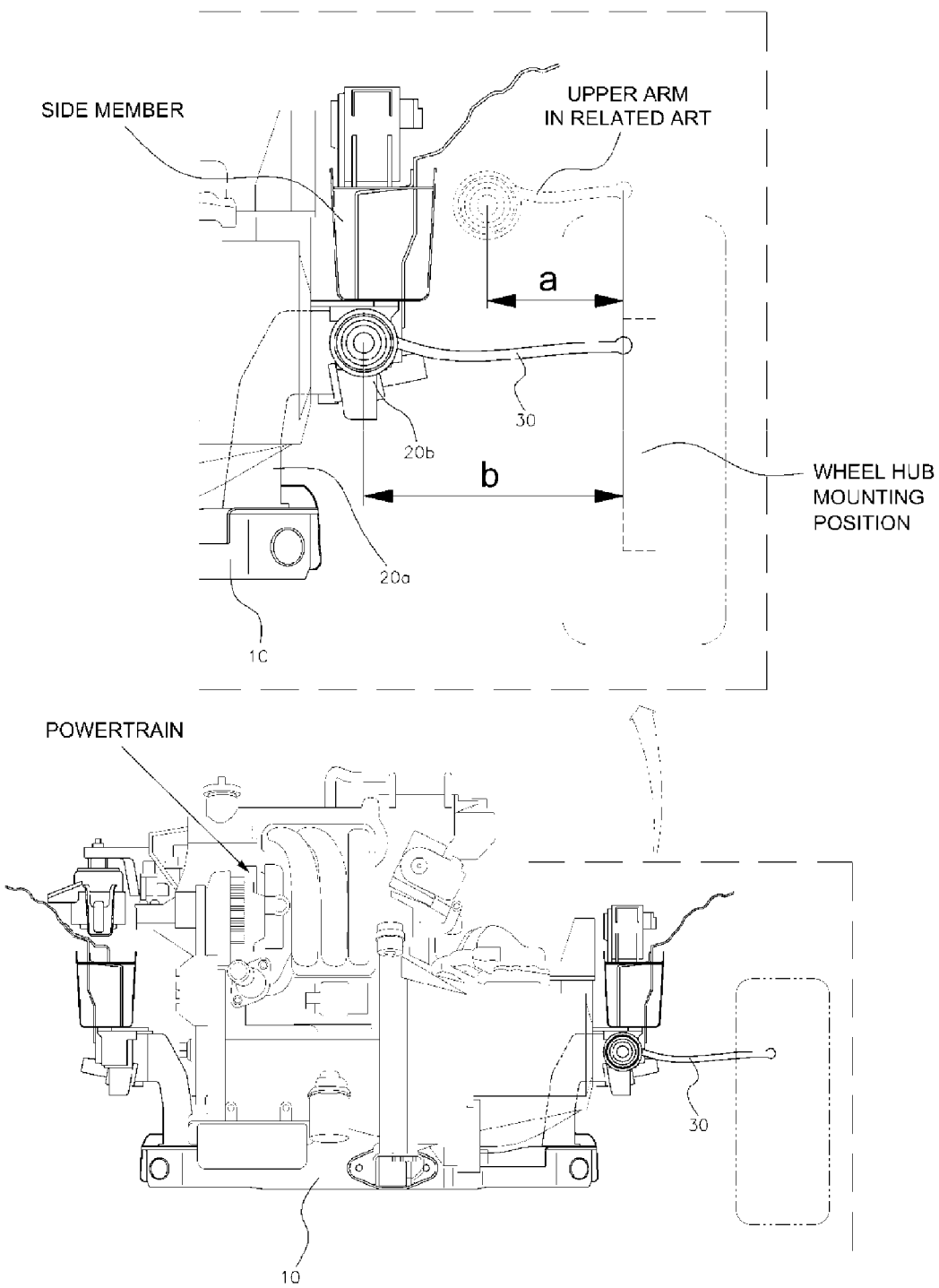
FIG. 3 is a view and a partially exploded view of a subframe mounted on a vehicle body toward the bottom of a powertrain according to an exemplary embodiment of the present invention.

As illustrated in FIG. 3, the subframe 100 configured as above is mounted on the vehicle body toward the bottom of the powertrain between side members on both sides in an engine room. (While not depicted in FIG. 3 for the sake of clarity of the drawing, the lower arm 40 is mounted to the open portion 11) and the upper arm 30 is mounted on the hinge brackets 21a and 21b of the mounting portion 20b. The upper arm 30 is bolted, fastened, and connected below the side member of the vehicle body, and may be manufactured in a length (b) greater than the related art length (a).

Figure 4:
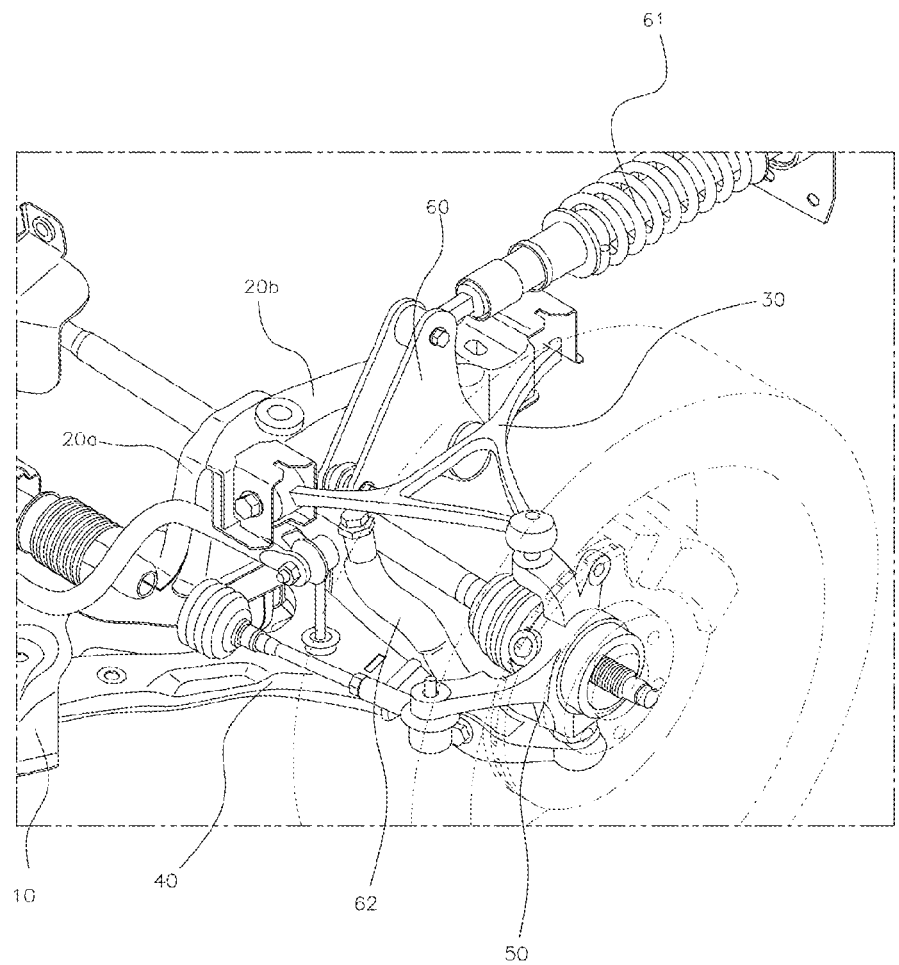
FIG. 4 is a perspective view of a subframe mounted according to an exemplary embodiment of the present invention, where a shock absorber is disposed in a lengthwise direction, and a rocker arm and a pushrod are mounted.
Figure 5:
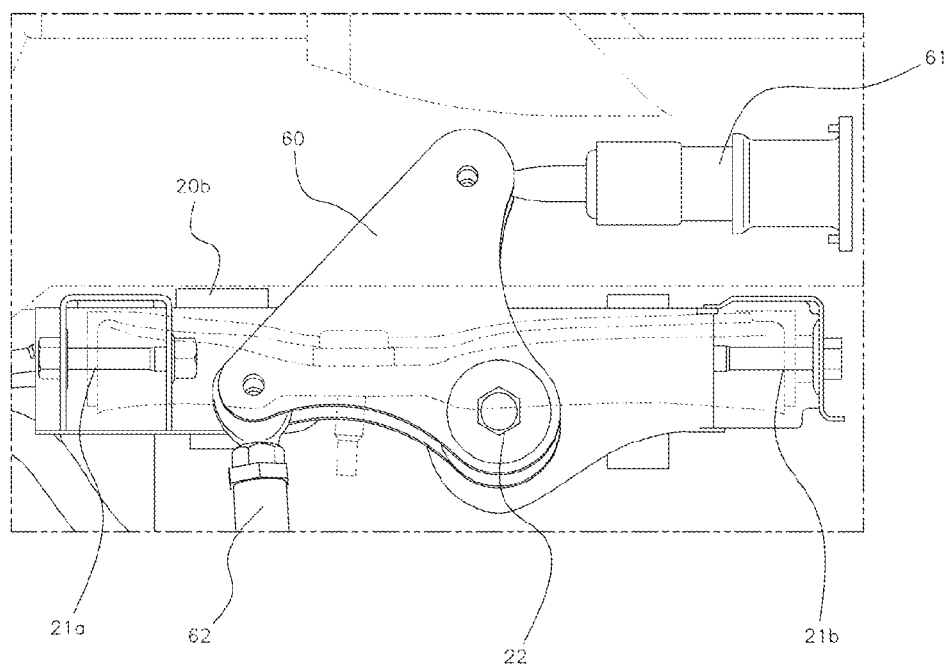
FIG. 5 is an enlarged view of a portion in FIG. 4.

Referring to FIGS. 4 and 5, the subframe 100 of an exemplary embodiment of the present invention may also be used in a method in which a shock absorber 61 is disposed in the lengthwise direction of the vehicle body and the rocker arm 60 and a pushrod 62 are mounted.

That is, the rocker arm 60 is pivotably coupled to the rocker arm bracket 22 formed on the mounting portion 20b, and the pushrod 62 connecting the rocker arm 60 and the wheel hub 50 is mounted between the hinge brackets 21a and 21b at both sides to which the upper arm 30 is connected, so that loads may be more stably transferred from the vehicle body and/or the ground.

The mounting portion 20b is directly fixed to the lower surface of the side member having high rigidity of the vehicle body, so that the shock absorber 61 and the upper arm 30 may be more stably supported.

For convenience in explanation and accurate definition in the appended claims, the terms "upper", "lower", "inner", "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a vehicle subframe mounted to a vehicle, in which a wheel hub is connected to a vehicle body through a lower arm and an upper arm disposed below and above one another, and in which the lower arm is coupled in a traverse direction of the vehicle, the structure of the vehicle subframe comprising:

a plate-shaped body mounted to a lower portion of the vehicle body, and having the lower arm mounted thereon in the traverse direction of the vehicle; and a mounting bracket protruding from the plate-shaped body upwards wherein the upper arm is pivotally coupled to an upper portion of the mounting bracket, wherein the mounting bracket includes a bar-shaped base erected upward from a top surface of the plate-shaped body, and a mounting portion formed on a top portion of the base, wherein the upper arm is pivotally connected thereto;

wherein the upper arm is formed with an end portion thereof diverged into two branches to form a "V" shape;

wherein the mounting portion includes hinge brackets respectively installed on one side and the other side thereof;

wherein each end of both diverged sides of the upper arm is pivotably coupled to the hinge brackets respectively;

wherein the vehicle body includes a shock absorber disposed along a longitudinal direction of the vehicle, a front end of the shock absorber being connected to a bumper, and a rear end of the shock absorber being coupled to a rocker arm connected to the wheel hub through a pushrod; and wherein the mounting portion includes a rocker arm bracket installed between the hinge brackets, the rocker arm bracket being pivotably coupled to the rocker arm, the rocker arm being pivotable in a front to rear direction of the vehicle.

2. The structure of the vehicle subframe of claim 1, wherein the mounting portion is aligned in a longitudinal direction of the vehicle.

3. A structure of a vehicle subframe mounted to a vehicle, in which a wheel hub is connected to a vehicle body through a lower arm and an upper arm disposed below and above one another, and in which the lower arm is coupled in a traverse direction of the vehicle the structure of the vehicle subframe comprising:

a plate-shaped body mounted to a lower portion of the vehicle body, and having the lower arm mounted thereon in the traverse direction of the vehicle; and a mounting bracket protruding from the plate-shaped body upwards wherein the upper arm is pivotally coupled to an upper portion of the mounting bracket, wherein the mounting bracket includes a bar-shaped base erected upward from a top surface of the plate-shaped body, and a mounting portion formed on a top portion of the base, wherein the upper arm is pivotally connected thereto; and wherein a top surface of the mounting portion is mounted below and directly coupled to a side member of the vehicle body.

* * * * *